United States Patent Office 3,254,130
Patented May 31, 1966

3,254,130
METHOD OF PREPARING AN ORGANIC PEROXIDE
Ermbrecht Rindtorff, Recklinghausen, and Wilhelm Ester, Herne, Germany, assignors to Bergwerksgesellschaft Hibernia Aktiengesellschaft, Herne, Germany, a corporation of Germany
No Drawing. Filed July 5, 1960, Ser. No. 40,567
Claims priority, application Germany, July 28, 1959, B 54,208
11 Claims. (Cl. 260—610)

It is known that tertiary hydroperoxides may be easily converted with tertiary alcohols into ditertiary dialkylperoxides in the presence of acids such as sulphuric acid or perchloric acid.

With the existing techniques until now it was however impossible to convert tertiary hydroperoxides which contain at least one aromatic group by this method into a diperoxide, since the tertiary hydroperoxides were decomposed under the effect of acids. For example, the preparation of dicumylperoxide from cumylhydroperoxide by treatment with a mineral acid is not possible, since cumylhydroperoxide splits in the presence of acids into phenol and acetone. Cumylhydroperoxide has been converted to dicumylperoxide only by thermal treatment under special conditions.

This reaction may be carried out either through heating for thirty-six hours with active carbon at 95° C. (40% yield) or through heating at 105° C. with glacial acetic acid (20–35% yield) or (the best method) through heating for 48 hours with phenyldimethylcarbinol at 95° C. Above all in the last case important amounts of byproducts result. None of these processes are suitable on a commercial scale.

The invention consists in a method for the preparation of organic compounds of the general formula:

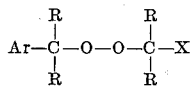

in which Ar is an aromatic or substituted aromatic radical, R is an aliphatic hydrocarbon radical and X is an aryl, substituted aryl, or alkyl group.

The process consists in taking a tertiary hydroperoxide with an alkyl radical of the formula

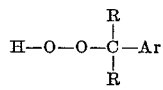

(R and Ar meaning the same as before) and reacting it with an aliphatic and/or an aromatic alcohol in the presence of perchloric acid.

The invention depends upon the surprising discovery that tertiary aromatic hydroperoxides may be converted to the organic compounds desired very easily, quickly and substantially quantitatively in the presence of perchloric acid. Perchloric acid obviously has a very specific activity because practically no decomposition of the hydroperoxide used takes place and the reaction proceeds in the direction of the condensation desired. This effect is all the more surprising because it had been considered from the previous scientific work as certain knowledge that at reactions like the present one on account of the risk of a decomposition of the hydroperoxide it was taken as a principle not to work in the presence of acids.

For instance the very thorough work of Kharasch, Fono and Nudenberg (J. org. Chem., 15, 748 ff. (1950)) arrives at the result that cumylhydroperoxide dissolved in glacial acetic acid at room temperature decomposes in an exothermic reaction if only 0.01 to 0.2% perchloric acid is added. But in fact the researches of the inventors have shown unequivocally that in the presence of perchloric acid, if other acids are not present, a reaction takes place almost exclusively in the direction of the desired condensation.

The acid concentration used depends upon the temperature at which the reaction is to be carried out. At lower temperatures higher concentrations of acid may be used than at higher temperatures, this acid concentration and temperature also influencing the formation of byproducts according to the quantity of the hydroperoxide. It is especially advantageous to work at a temperature below the decomposition temperature of the hydroperoxide. For example, the preparation of dicumylperoxide from cumylhydroperoxide and dimethylphenylcarbinol may be carried out between about 0°–95° C., preferably between 20°–60° C., with yields of 90% and upwards when the acid concentration referred to the alcohol present, lies within the range of about .001% to 50%, preferably 0.1 to 30%.

This method is especially convenient in that the reaction at low temperatures, even at room temperature, proceeds smoothly and practically quantitatively and that the time of reaction, compared with the usual thermal preparation, is many times shorter. For instance, dicumylperoxide, in the high yields stated above may be obtained at room temperatures in about 1 to 2 hours, while for the thermal preparation from cumylhydroperoxide 48 hours at 95° C. are needed for yields which are not as good as those obtained by following the disclosure of the invention. For instance by following the method of U.S. Patent No. 2,691,683 at a temperature of 106–132° C. a yield of 30% was obtained at maximum.

Suitable starting materials are for example: cumylhydroperoxide and phenyldimethylcarbinol; cumylhydroperoxide and butanol; di-isopropylbenzylhydroperoxide and carbinol or butanol; cumylhydroperoxide and triphenylcarbinol.

For carrying out the method batchwise it is expedient to proceed thus. The peroxide is permitted to flow slowly with stirring into the alcohol treated with acid at a temperature below the decomposition point of the hydroperoxide used. After a few minutes a distinct formation of water appears which may be continuously removed by known methods either completely or in part. The molar ratio of the peroxide to the alcohol is conveniently arranged so that sufficient excess of alcohol is present. After a run of about 1 to 2 hours the product in case it is solid is cooled, filtered and washed. The excess alcohol may be removed from the liquid or dissolved peroxide formed by a suitable distillation, conveniently thin-layer-distillation.

This method may also be carried out continuously thus: Perchloric acid is placed in the reaction vessel at the beginning of the reaction and alcohol, hydroperoxide and acid are added in amounts corresponding to the quantity of the product drawn off. It is conveniently arranged that the acid concentration during the whole reaction remains within the given region; in general the preparation is carried out at a more or less constant acid concentration.

The invention may be further described with reference to the following examples.

*Example 1*

500 gm. of dimethylphenyl carbinol and 0.5 gm. of perchloric acid were placed in a 1-l. flask fitted with a stirrer. Cumylhydroperoxide of about 87% purity (still containing 1.5% acetophenone, 6% dimethylbenzylalcohol and about 6% cumene) was run into the mixture of carbinol and perchloric acid with stirring, at 60° C.

Within two hours 290 gm. of cumylhydroperoxide of 87% purity had been introduced. The product was cooled to 10° C. and the precipitated α-cumylperoxide was centrifuged off. Upon working up of the mother-liquor 160 gm. of dicumylperoxide were obtained. This corresponds to a yield of about 95%. The mother-liquor still contains about 20% cumylhydroperoxide and may be used again for a second run. The melting point of the product obtained is 39.8° C.

*Example 2*

1000 gm. of dimethylphenylcarbinol and 200 gm. perchloric acid were placed in a 2 litre flask fitted with a stirrer. Altogether 650 gm. of 87% purity cumylhydroperoxide still containing 1% acetophenone, 5% dimethylbenzylalcohol, 6% cumene and 1.5% α-methylstyrene were added to the carbinol-perchloric acid mixture slowly with stirring at a temperature of 20° C. Within 45 minutes the reaction was complete. The cumylhydroperoxide had been completely changed by this time. The reaction-mixture was cooled to about 10° C. and the precipitated α-cumylperoxide centrifuged off. Upon working-up the mother-liquor altogether 932 gm. of dicumylperoxide were obtained. This corresponds to 94% yield. The melting point of the product was 40.2° C.

We claim:

1. The method of preparing peroxides which consists in the step of reacting a tertiary hydroperoxide of the formula

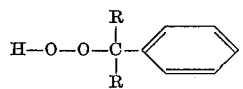

in which R is an alkyl with a member of the group consisting of α,α-dimethyl phenyl carbinol and triphenyl carbinol alcohols in the presence solely of perchloric acid.

2. Method as defined in claim 1, wherein the concentration of the perchloric acid is about 0.001 to 50% by weight based on the alcohol.

3. Method as defined in claim 2, wherein the concentration of the perchloric acid is about 0.1 to 30%.

4. Method as defined in claim 2, wherein the temperature of the reaction is about 0 to 95° C.

5. Method as defined in claim 4, wherein the temperature is room temperature.

6. A continuous method as defined in claim 1, wherein the concentration of the perchloric acid is kept constant by the addition of perchloric acid to the reaction mixture.

7. Method of preparing cumyl peroxide which comprises: bringing cumylhydroperoxide together with an excess, on a molar basis, of α,α-dimethyl phenyl carbinol into the presence solely of 0.001 to 50% of perchloric acid, based on the weight of the carbinol, at a temperature of 0° to 95° C. and allowing the said hydroperoxide and the carbinol to interact with each other.

8. Method of preparing cumyl peroxide which comprises slowly adding cumylhydroperoxide to a mixture consisting solely of α,α-dimethyl phenyl carbinol and perchloric acid, the acid being present in an amount of 0.001 to 50% based on the weight of the carbinol, at a temperature of 0° to 95° C., the carbinol being present, on a molar basis, in excess of that of the hydroperoxide.

9. Method in accordance with claim 8, wherein the perchloric acid is present in an amount of 0.1 to 30%.

10. Method in accordance with claim 8, wherein the temperature is room temperature.

11. Method in accordance with claim 9, wherein the temperature is room temperature.

References Cited by the Examiner

UNITED STATES PATENTS 2,668,180  2/1954  Boardman _____ 260—610
2,911,387  11/1959  Vandenberg.

FOREIGN PATENTS 792,558  3/1958  Great Britain.

OTHER REFERENCES

Kharasch et al., Jour. Organic Chem., 15: 775–776 (1950) (2 pages).

LEON ZITVER, *Primary Examiner.*

CHARLES B. PARKER, *Examiner.*